Nov. 29, 1960      A. C. QUIST      2,961,946
LIQUID ADHESIVE DEPOSITOR FOR SHELL MOLDS
Filed Jan. 2, 1959      2 Sheets-Sheet 1
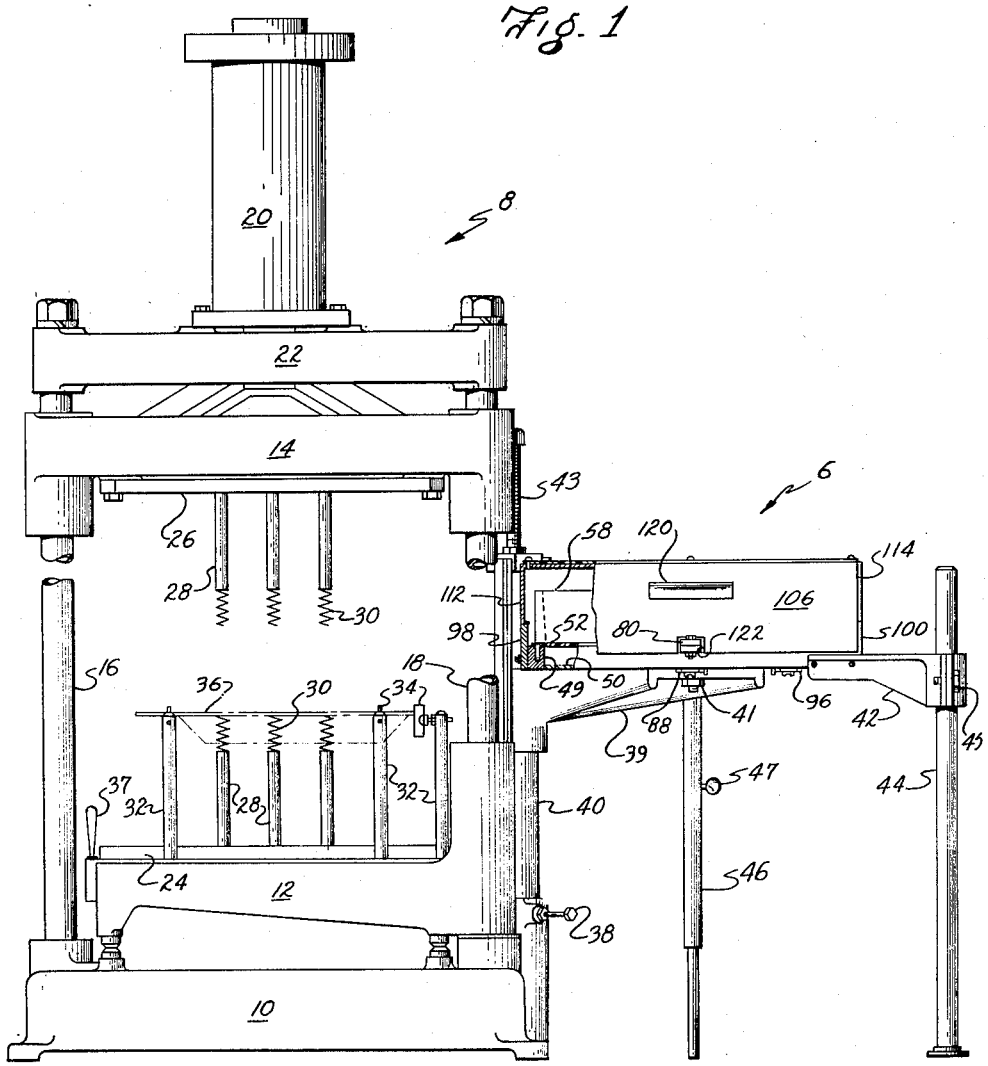
INVENTOR.
ALFRED C. QUIST
BY Chapin & Neal
ATTORNEYS

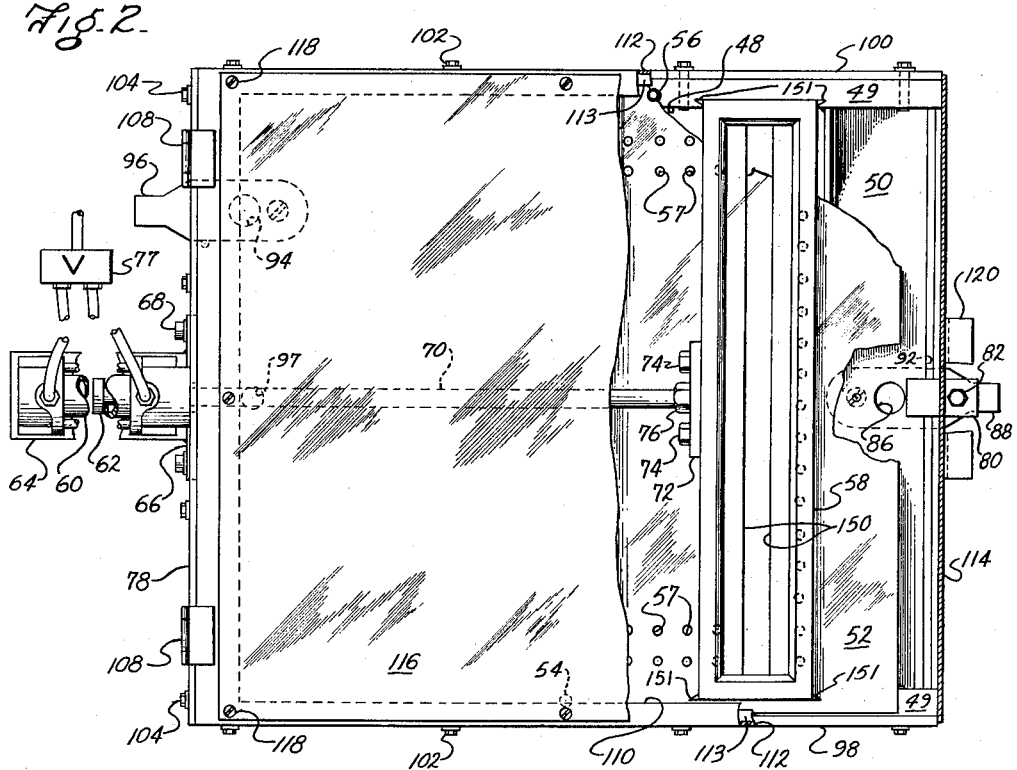
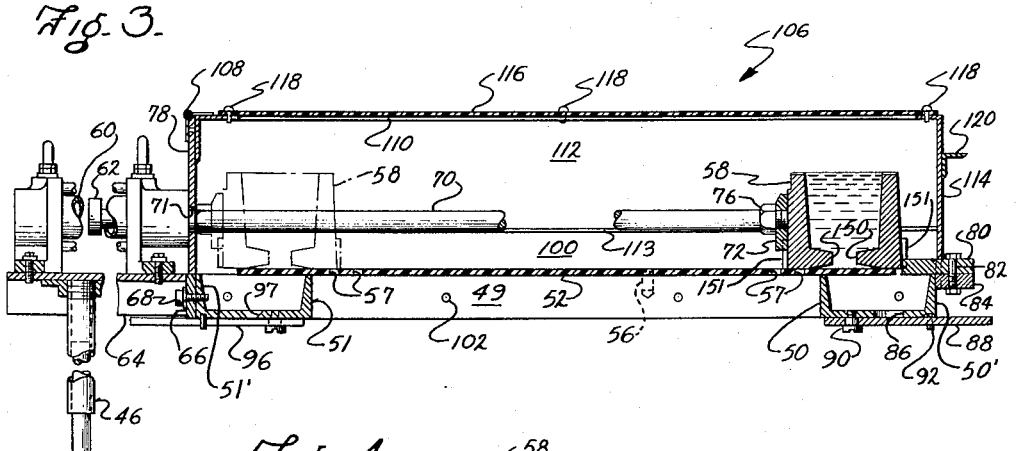
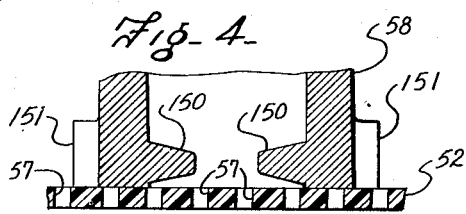
INVENTOR.
ALFRED C. QUIST
BY Chapin & Neal
ATTORNEYS _United States Patent Office_

2,961,946
Patented Nov. 29, 1960

2,961,946

LIQUID ADHESIVE DEPOSITOR FOR SHELL MOLDS

Alfred C. Quist, Southwick, Mass., assignor to Shell Process, Inc., Springfield, Mass., a corporation of Massachusetts Filed Jan. 2, 1959, Ser. No. 784,564

4 Claims. (Cl. 101—123)

This invention relates to shell bonding apparatus and more particularly to novel means for depositing liquid adhesive material on the parting line surfaces of shell molds.

In the shell mold process, two half molds are formed by thermosetting and heat curing a sand-resin mixture on pattern plates. The half molds are stripped from the pattern plates in a hot condition. A resinous bonding agent is then deposited on the parting line surfaces of the lower or drag half of the mold. The upper or cope half of the mold is registered with the drag half and the parting line surfaces are forced together under pressure until the bonding resin is thermoset by the residual heat of the molds.

In these mold operations, it has been a general practice to utilize dry or powdered type bonding agents. While agents of this type have proved satisfactory for achieving a good bond between the mold halves, difficulty has been encountered in the application of these agents to the mold parting line surfaces. Due to the powder-like nature of these adhesive agents, accurate control of the deposit of such agents onto the mold parting line surfaces is difficult since portions thereof may be displaced into the mold cavities by foundry drafts. This results in defective molds which turn out castings having surface imperfections. Also the scope of this problem is greatly increased with the use of devices for rapidly and automatically depositing the adhesive. While this problem has been partially solved by the utilization of liquid or paste type adhesive agents, the application of the liquid material is generally a manual operation. This is a relatively slow job and requires the services of a skilled worker.

It is the primary object of this invention to provide novel means for accurately and rapidly depositing a liquid adhesive material on shell mold parting line surfaces of various configurations.

It is also an object of this invention to provide a novel device of simple and inexpensive construction for depositing liquid adhesive material on shell mold parting line surfaces and which is operable by unskilled workmen.

It is still another object of this invention to provide a novel device for depositing a liquid adhesive suspension onto the parting line surfaces of a shell mold in which the reservoir supply of liquid is agitated during operation of said device to maintain a proper consistency and in which means are provided to insure that sufficient amounts of adhesive are deposited at the desired locations on such surfaces.

These and other objects and advantages of the invention will be apparent from a reading of the following specification.

In the drawings which form a part of the specification,

Fig. 1 is a front elevation of a liquid adhesive applicator or depositor embodying the invention and mounted on one type of shell bonding machine;

Fig. 2 is a plan view of the depositor shown in Fig. 1 and on an enlarged scale;

Fig. 3 is a longitudinal section of the depositor with its trough in a different operative position from that shown in Fig. 2 and filled with liquid adhesive; and Fig. 4 is a cross sectional view on an enlarged scale of the preferred form of trough construction to show details thereof.

Referring now in detail to the drawings, a liquid adhesive depositor is shown generally at 6 in Fig. 1. The depositor is mounted on a shell bonding apparatus 8 of a generally well known type.

The bonding apparatus 8 as shown comprises a base 10, a lower pressure shoe 12 and an upper pressure shoe 14. The upper pressure shoe is slidably disposed on columns 16 and 18 extending upwardly from the base 10. The upper pressure shoe 14 is moved vertically by the operation of an air cylinder 20 mounted on top of a cross bar 22. The bar 22 is supported on the upper end portions of columns 16 and 18.

A lower pressure plate 24 is mounted on the upper surface of the shoe 12 and an upper pressure plate 26 is mounted on the shoe 14. A plurality of pins, some of which are shown at 28, extend from the plates 24 and 26 in vertically aligned opposing relation and pressure springs 30 extend from the terminal ends of the pins 28. Posts 32 extend upwardly from the pressure shoe 12 and include fingers 34 for aligning the edges of the mold halves for the bonding operation.

In Fig. 1, a drag half mold only is indicated at 36 as supported on the lower springs 30. As shown hub portion of the shoe 12 is rotatably mounted on the column 18 and the shoe may be swung outwardly by the handle 37 to receive the drag and thereafter to swing the mold half 36 beneath the depositor 6 for registration therewith. In this position, liquid adhesive can be deposited on the parting line surfaces of the mold half. A stop nut 38 is provided to limit the extent of angular movement of the shoe and to insure accurate registration of the mold beneath the depositor 6. After a deposit of adhesive on the mold half 36, the shoe 12 may be swung back to receive the upper mold half and then placed in its bonding position which is the position illustrated in Fig. 1.

The adhesive discharge device of depositor 6 which is mounted adjacent the bonder 8 is preferably supported in the following manner. A cantilever bracket 39 extends radially outward from an upstanding post 40 of the base 10, the bracket supporting the rear end portion of the depositor 6 and securing the same as indicated at 41. Another bracket 42 extends outwardly from an upstanding floor supported post 44, its outer portion being secured to the front end of the depositor. The bracket 39 is mounted for vertical height adjustment on the post 40 by means of a jack screw 43. The bracket 42 of post 44 includes a split sleeve portion clamped on the post and is secured in the desired position by means of a screw 45. An additional floor-supported telescopic support 46 is positioned at the back of the depositor 6, the upper tube thereof having a thumb screw 47 provided for adjustably locking the lower rod of the support 46 in a desired position. The tube of post 46, as shown at the left hand end of Fig. 3, is fixed to the underside of a cylinder supporting channel member 64 which will be later referred to. The desired elevation of the depositor 6 may thus be readily arranged with respect to the mold supporting springs 30 of the plate 24 of lower shoe 12 by adjustment of the jack screw 43 and screws 45 and 47.

The depositor 6 is of a generally box-like construction. A rectangular frame includes longitudinally extending side members as the bars 49 and transversely disposed front and rear channel shaped members 50 and 51 (Fig. 3). This framework defines a bottom opening indicated at 48 in Fig. 2, the channel members 50 and 51 being secured between opposite end portions of the bars 49 as by welding. The front flanged wall at 50' and rear wall 51' of channels 50 and 51 respectively are in substantial alignment with the ends of the bars 49. The upper surfaces of the channel walls are disposed in substantially the same plane as the upper surfaces of the side bars. The depositor 6 further includes upstanding side plates 98 and 100 fixed to the side bars, a back plate 78 fixed to wall 51' and a cover 106 hinged to back plate 78.

Various templates of rectangular shape, one of which is indicated at 52, may each be removably supported on the depositor frame. The templates which are used for various molds are of such size that the side edge portions thereof rest on the upper surfaces of the side bars 49 and the front and rear edges terminate between the front and rear flanged walls of channels 50 and 51 (see Fig. 3). Dowel pins 54 and 56 may extend upwardly from the side bars 49 (Fig. 2) and each template is apertured for receiving the pins for correct registration of the template with the position of a mold carried beneath the depositor on the shoe 12. The template 52 may be either plastic or metallic and includes a plurality of apertures 57 (Fig. 2) disposed in predetermined arrangement for use with a given mold and in accordance with the configuration of the parting line surfaces thereof. Preferably the template is of a transparent plastic material, such as Plexiglas, the transparent character being ideally suited for locating aperture positions for a given shell mold. By simply placing the sheet of Plexiglas in superposed relation on a shell mold half, aperture locations may be located by inspection and marked on the plastic to indicate where holes need to be drilled. This insures correct disposition of the apertures 57 with respect to the parting line surfaces of a given shell mold and eliminates the necessity of trial and error methods. Each template 52 has imperforate marginal portions at its front and rear edges (Fig. 3), these portions being of sufficient size to underlie the trough 58 for reasons which will become apparent.

Trough 58 is an elongated member defined by rectangularly disposed upstanding wall portions. It extends crosswise of the frame and forms with the template surface a slidably supported adhesive reservoir for reciprocation over the perforated template surface and from which a controlled deposit of adhesive can be made through the openings 57. The trough at each imperforate end of the template confines the liquid adhesive material between depositing operations.

The trough walls are relatively heavy and the under edge surfaces thereof rest on the template with sufficient surface contact to prevent any material seepage of liquid therefrom either when positioned at the imperforate end margins of the template or when the trough slides from one end to the other.

During the passage from one end to the other, portions of the liquid adhesive flow from the trough into the apertures 57 and drop on a mold registered underneath. The adhesive falls from the apertures onto the parting line surfaces with accuracy and in the form of trough disclosed in the drawings as will be later specifically described in such amounts as will be sufficient for the secure bonding of the mold halves.

Means for moving the trough back and forth across the template comprise an air cylinder 60 and its piston 62. This mechanism may be of conventional construction and is appropriately mounted on the upper surface of a channel bar 64, the inner end of bar 64 being secured to a plate 66 as by welding. Plate 66 is in turn attached to rear wall 51' of the channel 51 by cap screws as at 68.

Piston 62 drives a rod 70 through an opening 71 of an end plate 78 and is threaded at its outer end into an adapter plate 72 fixed centrally on the rearward wall of the trough by screws 74. A jam nut 76 locks the rod on the adapter plate 72. A cylinder valve (Fig. 2) is indicated at 77 for controlling the flow of compressed air into each end of the cylinder 60 for reciprocation of the trough 58 across template 52.

It will be realized that the diameter of apertures 57, the thickness of template 52, and the speed of movement of the trough may be so related to the viscosity of a liquid adhesive that a single pass of the trough across the template will cause a correct amount of liquid adhesive to pass through the openings to be deposited on the mold.

The interrelationship of these particular factors may, of course, be altered to achieve a desired result. As an example, it has been found that by using a liquid adhesive with a Baumé hydrometer reading of 40° after the hydrometer is allowed to settle for five minutes in the adhesive, providing apertures 57 of approximately 3/16 inch in diameter in a template of 3/16 inch thickness, and moving the trough 58 with a traverse speed of approximately 20 feet per minute, a desirable amount of liquid adhesive is deposited with the preferred form of trough as disclosed in Figs. 2 and 3.

Means for limiting the movement of the trough 58 at the end of the outward stroke of the piston rod 70 comprises a stop lever 80 pivotally mounted on a bolt 82 threaded into and extending upwardly from a small metal bracket 84, welded to the depositor at the front end thereof. At the other end of the depositor trough movement is limited by engagement of the jam nut 76 with the back plate 78.

It will be noted that when the stop 80 is in its operable position, as is shown in Fig. 3, the leading wall portion of the trough will abut the stop and the lower edge of the wall will overhang the edge of the template. Thus any adhesive wiped from the template surface by the advance of the leading wall will fall into the channel 50. Likewise, at the other end of the template as shown by the phantom lines of the trough in Fig. 3, the trough will there deposit any wipings into channel 51.

As will be realized by the above stated purpose of the channels 50 and 51, passage of the trough may leave, and usually does leave, a film or residue of adhesive on the surfaces of the template. This film does not, however, build up since the weight of the trough is sufficient to cause a squeegee action of the leading wall against the template surface to wipe it clean on the next pass of the trough.

Referring again to the stop 80, this stop may be pivoted to an inoperable position to permit sufficient further movement of the trough to place the wall thereof beyond the edge of the template. Thus the entire contents of trough 58 may be readily drained into channel 50. It is desirable, of course, to empty the trough when shutting down the bonding machine for any reason such as changing a template to accommodate another mold having differently located parting line surfaces. Such templates as will be readily appreciated are tailored for each individual shell mold pattern. It will be seen that a template 52 may be removed by first emptying the contents of the trough into the channel 50 and then retracting the piston rod to carry the trough to its extreme position at the other or rear end of the frame as shown in phantom lines in Fig. 3. The template may then be lifted at the front edge of the frame to disengage the dowel positioning pins 54 and 56 and the template can be withdrawn forwardly to slide the rear edge thereof from underneath the walls of trough 58.

Channel 50 includes a bottom opening 86 through which the liquid adhesive material may be drained. A drain cover plate 88 is pivotally mounted on a stud 90 which extends downwardly from the bottom of the channel 50. A dowel pin 92 also extends downwardly from the bottom of the channel 50 for insuring registration of the cover 88 to close off the drain opening 86. The rear channel 51 also includes a drain opening 94 (see Fig. 2) and a cover 96 of similar construction to the drain described for the forward channel. The rear channel 51 is used to collect the residue of adhesive which is wiped or cleaned from the surface of the template by the rearward movement of the trough. The drain 94 is provided for the removal and collection of this residue which may be subsequently reused in the trough 58. The beveled hole 97 also seen at the center of channel 51 (Fig. 2 and Fig. 3) is provided for receiving the screw 41 for attachment of the bracket 39 seen in Fig. 1.

The side plates 98 and 100 of the depositor are secured against the outer surfaces of the side bars 49 by means of screws 102. The side plates extend upwardly to a height above the upper surfaces of the bars 49. The rear wall or back plate 78 through which rod 70 extends is secured to the rear wall 51' of the channel 51 by means of screws 104. The cover 106 is hinged to the back plate 78 as shown at 108 and includes a top portion 110, in the form of a rectangular frame, side wall portions 112 and a front wall portion 114. A transparent plate 116 is secured to the top of the cover member by means of screws 118. At the bottom of the side wall portions 112 of the cover inwardly formed flanged lower edges 113 are adapted to engage the upper edges of the side walls 98 and 100. The front wall portion of the cover includes a handle 120 for raising and lowering the cover and a recess or slot 122 for receiving the stop 80 and permitting complete closure of the cover. The plate 116 is preferably made of a transparent plastic material such as Plexiglas. This enables the operator to observe the operation at all times without the necessity of opening the cover. The cover will keep adhesive and the template free of dust and foreign matter which might otherwise be a source of considerable trouble.

It has been found that an adhesive material well suited to the shell bonding operation consists of a powdered bonding resin in suspension in oil. The resin particles, however, have a tendency to settle or separate from the oil, unless the adhesive is regularly mixed or agitated. The present invention meets the need for a means to retain the resin particles in suspension in the oil by agitating the liquid suspension whenever the depositor is in operation. As the trough 58 is moved across the template, that portion of the template between the walls is in contact with the liquid confined therein. Since the template is stationary with respect to the moving body of liquid, a frictional surface drag at the bottom of the body of liquid causes a circulation or mixing action of the liquid to take place. Such circulation is also aided by the fact that the front and rear wall portions of the trough 58 are oppositely inclined-convergently from their top edges. This formation permits the circulation of liquid to take place within the trough each time the trough passes across the template to apply the controlled deposit of adhesive.

As has previously been noted above the factors of aperture diameter, template thickness, trough speed, and specific gravity of suspension need to be interrelated for a desirable result in applying adhesive to the mold surfaces. Variations may be made among the stated particulars and good results achieved but it will also be recognized that the static head pressure of the reservoir of liquid in trough 58 is also a factor.

In this connection it has been discovered that the static head of liquid in a trough having uninterrupted side walls performs quite satisfactorily in the environment specified in the previously stated example when the level of liquid in the trough is approximately at or above the half way mark. Thus the level of the trough must be maintained by replenishing the supply whenever the half full mark is reached. In order to be able to utilize substantially the full capacity of the trough contents the trough is preferably formed as best shown by Fig. 4.

In Fig. 4 and adjacent the bottom of the trough wall inner surfaces are oppositely facing tongue members 150 protruding from the walls. Tongues 150 extend from one end wall to the other and are provided with upper and lower surfaces directed convergently towards the free ends thereof. It will also be noted that the lower surfaces of the tongues join the surfaces of the reservoir walls above the bottom edges thereof.

It has been found that the angle of the lower surface and the slightly raised position with relation to the template supporting surface are fairly critical for best results for the following reasons. As the trough passes over the template the liquid adhesive flows into the openings 57 to drop down onto the mold as previously described. However, unless there is sufficient static head a satisfactory quantity of adhesive may not drop through. Accordingly by providing the tongues a rolling or pressing action on the adhesive is had underneath the tongue. Thus the tongue "pushes" on the liquid to force a sufficient amount through the opening. As to the raised position of the tongues it has been found that if the lower surface of the tongue joins the lower edge of the trough wall the liquid tends to seep through underneath the wall without imparting any pressure to eject fluid through the openings. On the other hand a slightly raised position blocks any such seepage and serves as above explained to "roll" and build up a head to press the liquid underneath the tongue and force its passage through the openings whatever the level of adhesive in the reservoir. The angle of the lower surface of the tongue may be on the order of 15° from the horizontal and the spacing from the lower edge of the trough wall on the order of 1⁄32 inch.

The plow tips at 151 at each edge of the trough (see also Fig. 2) are provided to assist the wiping action as the trough is advanced.

The controlled deposit of adhesive achieved by the preferred form of trough has been found to have the most useful application to many different forms of molds. It will be realized, however, that other expedients may be utilized without departing from the spirit of the invention and scope of the appended claims.

What is claimed is:

1. A device for depositing a liquid adhesive material on the parting line surfaces of a shell mold, said device comprising a rectangular frame defining an opening and including longitudinally extending side members and transversely disposed upwardly opening channels, a transparent plastic template removably supported on said frame with its side edge portions overlying said side members and its front and rear edges terminating intermediate the wall portions of said upwardly opening channels, said template having a plurality of apertures therethrough disposed in a predetermined pattern, an elongated trough member supported on the upper surface of said template and including upstanding wall portions, said trough having a bottom opening defined by the lower inner edges of its wall portions, piston actuated means for alternately moving said trough back and forth across said template from a position adjacent the front edge of said template to another position adjacent the rear edge of said template, said template further including imperforate portions disposed adjacent said front and rear edges, stop means for limiting the movement of said trough to terminal positions in which the imperforate portions of said template underlie the bottom opening of said trough and in which the leading edges of the wall portions of said trough extend beyond the front and rear edges of said template, said stop means being movable to a position in which the bottom opening of said trough is placed in communication with the interior of one of said upwardly opening channels for draining said trough.

2. A device for depositing a liquid adhesive material on the parting line surfaces of a shell mold, said device comprising a rectangular frame defining an opening and including longitudinally extending side bars and transversely disposed upwardly opening channels secured therebetween, the upper surfaces of said bars and said channel members lying in substantially the same plane, a transparent plastic template removably supported on the top of said frame with its side edge portions overlying said side bars and front and rear edges terminating intermediate the wall portions of said upwardly opening channels, said template having a plurality of apertures therethrough disposed in a predetermined pattern, said frame including means for registering the template in a fixed position thereon, an elongated trough member supported on the upper surface of said template and including rectangularly disposed upstanding wall portions for confining a liquid adhesive material in a body on the upper surface of said template, the inner surfaces of the transverse wall portions of said trough being oppositely inclined downwardly and inwardly, said trough having a bottom opening defined by the lower inner edges of its wall portions, an air actuated piston for selectively moving said trough member back and forth across said template from a position adjacent the front edge of said template to another position adjacent the rear edge of said template, said template further including imperforate portions disposed adjacent said front and rear edges at least as large as said bottom opening, stop means for limiting the extent of movement of said trough to positions in which the imperforate portions of said template underlie the bottom opening of said trough and in which the leading edges of the transverse wall portions of said trough extend beyond the front and rear edges of said template, said stop means being movable to a position in which said bottom opening is placed in communication with the interior of one of said upwardly opening channels for draining said trough.

3. A device for depositing liquid adhesive material on the parting line surfaces of shell molds, said device comprising a frame registrable in superposed relation to said shell molds, a frame supported plate having a predetermined pattern of perforations with imperforate end sections, an open bottom trough member supported on said plate and slidable from end to end over the upper surface thereof with the walls of said trough member in surface engagement with said plate, said trough member in its terminal end positions overlying said imperforate sections with the leading edges of the trough disposed at the edges of the plate, means for moving said trough member back and forth across said plate to release through the perforations in said plate portions of liquid adhesive carried in said trough member, the weight of said trough member acting to maintain said surface engagement and being of sufficient magnitude to confine said liquid within the walls of said trough and to enable the leading edges thereof to wipe superfluous adhesive from the upper surface of said plate, and means underlying the end edges of said plate for receiving said superfluous adhesive.

4. A device for depositing liquid adhesive material on the parting line surfaces of shell molds, said device comprising a rectangular frame defining an opening and including transversely disposed, upwardly opening channels, a template removably supported on said frame with its transverse edges disposed intermediate the wall portions of said upwardly opening channels, said template having a plurality of apertures therethrough disposed in a predetermined pattern, an elongated trough member directly supported on the upper surface of said template and including upstanding walls, said trough having a bottom opening defined by the lower inner edges of its walls, means for moving said trough back and forth across said template to positions adjacent the transverse edges of said template, said template having imperforate portions disposed adjacent said transverse edges, means for limiting the stroke of said trough to terminal positions in which the imperforate portions of said template underlie the bottom opening of the trough and in which the leading edges of the trough walls extend beyond the transverse edges of said template, the weight of said trough member acting to maintain the under surface of the trough walls and the template in surface engagement and to enable the leading edges of said trough to wipe superfluous adhesive from the upper surface of said template.

References Cited in the file of this patent
UNITED STATES PATENTS

| | | |
|---|---|---|
| 538,354 | Schweitzer | Apr. 30, 1895 |
| 1,413,995 | Salerno | Apr. 25, 1922 |
| 1,494,798 | Odajian | May 20, 1924 |
| 1,861,611 | Respess | June 7, 1932 |